(12) United States Patent
Graham

(10) Patent No.: US 9,137,326 B2
(45) Date of Patent: Sep. 15, 2015

(54) DISTRIBUTED CACHE SYSTEM FOR OPTICAL NETWORKS

(75) Inventor: Norman B. Graham, Danville, KY (US)

(73) Assignee: Calix, Inc., Petaluma, CA (US)

( * ) Notice: Subject to any disclaimer, the term of this patent is extended or adjusted under 35 U.S.C. 154(b) by 263 days.

(21) Appl. No.: 13/585,147

(22) Filed: Aug. 14, 2012

(65) Prior Publication Data
US 2014/0052814 A1   Feb. 20, 2014

(51) Int. Cl.
H04L 29/08 (2006.01)
G06F 17/30 (2006.01)

(52) U.S. Cl.
CPC ...... *H04L 67/2842* (2013.01); *G06F 17/30902* (2013.01); *H04L 67/2885* (2013.01)

(58) Field of Classification Search
CPC .............. G06F 15/16; G06F 17/30902; H04L 67/2842; H04L 67/2885
USPC .................................................. 709/217, 219
See application file for complete search history.

(56) References Cited

U.S. PATENT DOCUMENTS

| | | | | |
|---|---|---|---|---|
| 7,076,544 B2* | 7/2006 | Katz et al. | ...................... | 709/223 |
| 7,979,509 B1* | 7/2011 | Malmskog et al. | ........... | 709/219 |
| 8,208,815 B1* | 6/2012 | Chiang et al. | .................. | 398/155 |
| 8,650,164 B2* | 2/2014 | Rothschild et al. | ........... | 707/693 |
| 2006/0222365 A1* | 10/2006 | Jung et al. | ........................ | 398/72 |
| 2008/0253568 A1* | 10/2008 | Sakai et al. | .................... | 380/256 |
| 2009/0052897 A1* | 2/2009 | Kazawa et al. | ................. | 398/71 |
| 2009/0210549 A1* | 8/2009 | Hudson et al. | ................. | 709/231 |
| 2011/0066715 A1* | 3/2011 | Schieder et al. | .............. | 709/223 |
| 2011/0103374 A1* | 5/2011 | Lajoie et al. | ................... | 370/352 |
| 2014/0089995 A1* | 3/2014 | Hasek | ............................. | 725/88 |

OTHER PUBLICATIONS

G.984.3, International Telecommunications Union-Telecommunications Standardization Sector of ITU, "Series G: Transmission Systems and Media, Digital Systems and Networks," Mar. 2008, 146 pages.

Graham, "The Cloud has a Silver Lining—Moving Beyond Flat-Rate Internet Billing," Calix, White Paper, Mar. 2012, 13 pages.

* cited by examiner

Primary Examiner — Michael C Lai
(74) Attorney, Agent, or Firm — Shumaker & Sieffert, P.A.

(57) ABSTRACT

Caching techniques are described. An example network device positioned between an optical line terminal (OLT) and a service provider device includes a hot cache, a wide cache controller, and a control unit. The control unit is configured to receive, from a first service delivery platform, a request for digital content, and determine whether the requested digital content is stored on the hot cache. The control unit is further configured to, when the requested digital content is not stored on the hot cache, determine, using the wide cache controller, whether the requested digital content is stored on a wide cache of a second service delivery platform, receive, from the second service delivery platform, the requested digital content, and responsive to the request received from the first delivery platform, send the received digital content to the first delivery platform.

20 Claims, 4 Drawing Sheets

DISTRIBUTED CACHE SYSTEM FOR OPTICAL NETWORKS

TECHNICAL FIELD

The present disclosure generally relates to a caching system that may be deployed in optical networks.

BACKGROUND

An end-user of a network may request various types of data, such as digital video content, using the network. For example, the end-user (or "subscriber") may submit a request using a subscriber device (e.g., a computer, television set-top box, etc.) that is connected or otherwise coupled to a service delivery platform. In the context of optical networks and other network architectures that include optical network elements, examples of service delivery platforms include optical network units (ONUs) and/or optical network terminals (ONTs). In response to receiving a digital content request from a subscriber device, the service delivery platform may forward the request for the digital content over the network. In turn, the service delivery platform may receive the requested digital content, and distribute the digital content to the respective subscriber device(s) that sent the original request.

SUMMARY

In accordance with one or more techniques of this disclosure, each service delivery platform for each end user may implement a transparent caching scheme in populating its respective wide cache with digital content. As a result, different service delivery platforms may store varying digital content on their respective wide caches, based on the specific requests received from corresponding downstream customer premises equipment (CPE) of the end user.

Additionally, the techniques may provide for the use of a cache, sometimes referred to as a "hot cache," implemented on an optical line terminal (OLT) or a device positioned upstream of the OLT, such as a server or router positioned in the service provider network. Similar to the various wide caches, the device equipped with the hot cache may implement a transparent caching scheme. In turn, the hot cache may store digital content that is most frequently requested over an entirety of the PON, as the hot cache monitors content requested by all service delivery platforms of the PON. Additionally, the hot cache may store references, such as pointers, to digital content stored on each wide cache of the various service delivery platforms.

In accordance with one or more aspects of this disclosure, the hot cache and the various wide caches may function in a distributed, cooperative manner. For example, if a particular service delivery platform receives a request for certain digital content, the service delivery platform may check whether the requested content is stored to its own wide cache. If the content is not available from the service delivery platform's own wide cache, the service delivery platform transmits the request to the upstream network device equipped with the hot cache. In response to the request, the upstream network device may determine whether the requested content is available in the hot cache. If available, the upstream network device may transmit the requested content to the service delivery platform which transmitted the request.

If the requested content is not available from the hot cache, the upstream network device may determine whether the requested content is available on a wide cache of any other service delivery platform in the PON. If the upstream network device locates the requested content on the wide cache of another service delivery platform, the upstream network device may request the content from the other service delivery platform, and transmit the content to the service delivery platform that transmitted the original request for the content.

If the requested content is not found on any of the hot cache or the various wide caches, the upstream network device may forward the request farther upstream over the service provider network (e.g., to service provider device). In this case, the service provider device transmits the requested content to the upstream network device, which then transmits the requested content to the service delivery platform. Content obtained by the service delivery platform (and, in examples, forwarded to a subscriber) in this fashion is often referred to as over-the-top (or "OTT") content.

After the requesting service delivery platform receives the requested content from its wide cache, the hot cache, the wide cache of another service delivery platform, or from the service provider device, the service delivery platform forwards the requested content to the requesting customer premises equipment (CPE). In this way, techniques of this disclosure are directed to a distributed, cooperative caching system that may enable faster, more efficient, and higher quality supply of digital content requested by an end user.

In one example, a method includes receiving, by a network device positioned between an optical line terminal (OLT) and a service provider device, a request for digital content from a first service delivery platform, determining, by the network device, whether the requested digital content is stored on a hot cache of the network device, and, when the requested digital content is not stored on the hot cache, determining, by the network device, whether the requested digital content is stored on a wide cache of a second service delivery platform. The method further includes sending, by the network device, when the requested digital content is stored on the wide cache of the second service delivery platform, a backup request for the requested digital content to the second service delivery platform, receiving, by the network device from the second service delivery platform, the requested digital content, and sending, by the network device, the received data to the first service delivery.

In another example, a network device positioned between an optical line terminal (OLT) and a service provider device includes a hot cache configured to store digital content, a wide cache controller configured to store one or more references to digital content stored on a plurality of service delivery platforms, and a control unit. The control unit is configured to receive, from a first service delivery platform, a request for digital content, and determine whether the requested digital content is stored on the hot cache. The control unit is further configured to, when the requested digital content is not stored on the hot cache, determine, using the wide cache controller, whether the requested digital content is stored on a wide cache of a second service delivery platform, receive, from the second service delivery platform, the requested digital content, and responsive to the request received from the first delivery platform, send the received digital content to the first delivery platform.

In another example, a computer-readable storage device is encoded with instructions that, when executed, cause one or more programmable processors of a network device to perform receive, a request for digital content from a first service delivery platform communicatively coupled to the network device, determine whether the requested digital content is stored on a hot cache of the network device, and when the requested digital content is not stored on the hot cache, determine, whether the requested digital content is stored on a wide cache of a second service delivery platform communicatively coupled to the network device. The instructions further cause the one or more programmable processors to, when the requested digital content is stored on the wide cache of the second service delivery platform, send a backup request for the requested digital content to the second service delivery platform, receive, from the second service delivery platform, the requested digital content, and send the received digital content to the first service delivery platform.

In another example, a network device includes means for receiving a request for digital content from a first service delivery platform, determining, whether the requested digital content is stored on a hot cache of the network device, and, when the requested digital content is not stored on the hot cache, determining whether the requested digital content is stored on a wide cache of a second service delivery platform. The network device further includes means for sending, when the requested digital content is stored on the wide cache of the second service delivery platform, a backup request for the requested digital content to the second service delivery platform, receiving, from the second service delivery platform, the requested digital content, and sending the received data to the first service delivery.

In another example, a method includes receiving, by a service delivery platform and from a subscriber device, a request that identifies digital content, and responsive to receiving the request, determining whether the digital content is stored on a wide cache of the service delivery platform. The method further includes when the digital content is not stored on the wide cache, forwarding the received request to a network device, receiving, from the network device, the requested digital content, where the received digital content includes at least one of 1) digital content stored on a hot cache of the network device, and 2) digital content that is stored on another wide cache of another service delivery platform and that is sent from the another service delivery platform via the network device. The method further includes forwarding the received digital content to the subscriber device.

In another example, a service delivery platform includes an optical network interface, a wide cache, and a control unit. The control unit is configured to receive, at the optical network interface and from a network device positioned between the service delivery platform and a service provider device, a backup request that identifies digital content, and to determine whether the identified digital content is stored on the wide cache. The control unit is further configured to, when the identified digital content is stored on the wide cache, send the identified digital content from the optical network interface to the network device positioned between the service delivery platform and the service provider device.

In another example, a service delivery platform includes means for receiving from a subscriber device, a request that identifies digital content, and responsive to receiving the request, determining whether the digital content is stored on a wide cache of the service delivery platform. The service delivery platform further includes means for forwarding, when the digital content is not stored on the wide cache, the received request to a network device, receiving, from the network device, the requested digital content, where the received digital content includes at least one of 1) digital content stored on a hot cache of the network device, and 2) digital content that is stored on another wide cache of another service delivery platform and that is sent from the another service delivery platform via the network device. The service delivery platform further includes means for forwarding the received digital content to the subscriber device.

In another example, a computer readable storage device includes instructions that, when executed, cause one or more programmable processors of a service delivery platform to receive from a subscriber device, a request that identifies digital content, and responsive to receiving the request, determine whether the digital content is stored on a wide cache of the service delivery platform. The instructions further cause the programmable processor(s) to forward, when the digital content is not stored on the wide cache, the received request to a network device, receive, from the network device, the requested digital content, where the received digital content includes at least one of 1) digital content stored on a hot cache of the network device, and 2) digital content that is stored on another wide cache of another service delivery platform and that is sent from the another service delivery platform via the network device. The instructions further cause the programmable processor(s) to forward the received digital content to the subscriber device.

The techniques of this disclosure may provide certain potential advantages. As one example, the techniques may mitigate or prevent congestion of downstream data traffic (e.g. at areas linking an upstream network device to an OLT, areas linking an OLT to an optical splitter, etc.). As another example, digital content, such as video data, may be efficiently distributed across various devices and stages of an access network. In turn, the efficient distribution of the digital content may reduce costs associated with repeatedly requesting the same digital content from the service provider, and retransmitting the same digital content from the service provider downstream to one or more service delivery platforms. As another example, the techniques may effectively move more frequently requested content closer to the subscriber (i.e., reduce the logical distance between the storage location of the digital content and CPE used by a subscriber). By moving this digital content closer to the subscriber, the techniques may mitigate content quality degradation associated with transmitting the data over greater logical distances. Moreover, by reducing the distance over which data travels via coaxial cables, the techniques may further mitigate quality degradation, which is a disadvantage associated with cable coaxial networks.

The details of one or more examples are set forth in the accompanying drawings and the description below. Other features, objects, and advantages of this disclosure will be apparent from the description and drawings, and from the claims.

DETAILED DESCRIPTION

With increasing consumer demand for data usage, particularly for digital video content, consumers may face issues related to scarcity of available network bandwidth. In the context of a passive optical network (PON), scarcity of available bandwidth may lead to issues such as delays in receiving requested digital content. In scenarios where an end user requests digital video and/or audio data, such delays may cause lags, latency, and other quality issues. To alleviate quality issues caused by diminished bandwidth, digital content may be cached at various levels of the PON and/or the service provider network.

Caching systems known in the art include so-called "managed" and "transparent" caching systems. In the case of a managed caching system, a device or administrator may determine the particular content that is to be cached, and cause, for example, a downstream network device to store the predetermined content. In a transparent caching system, on the other hand, a network device may be equipped to monitor content that passes through the network device, and capture and store content that passes through at a certain frequency. In examples, a network device implementing a transparent caching system may replace currently cached content with new content that exceeds a certain frequency (e.g., based on cache storage limitations, a time period over which the new content was requested, and various other factors).

Figure 1:
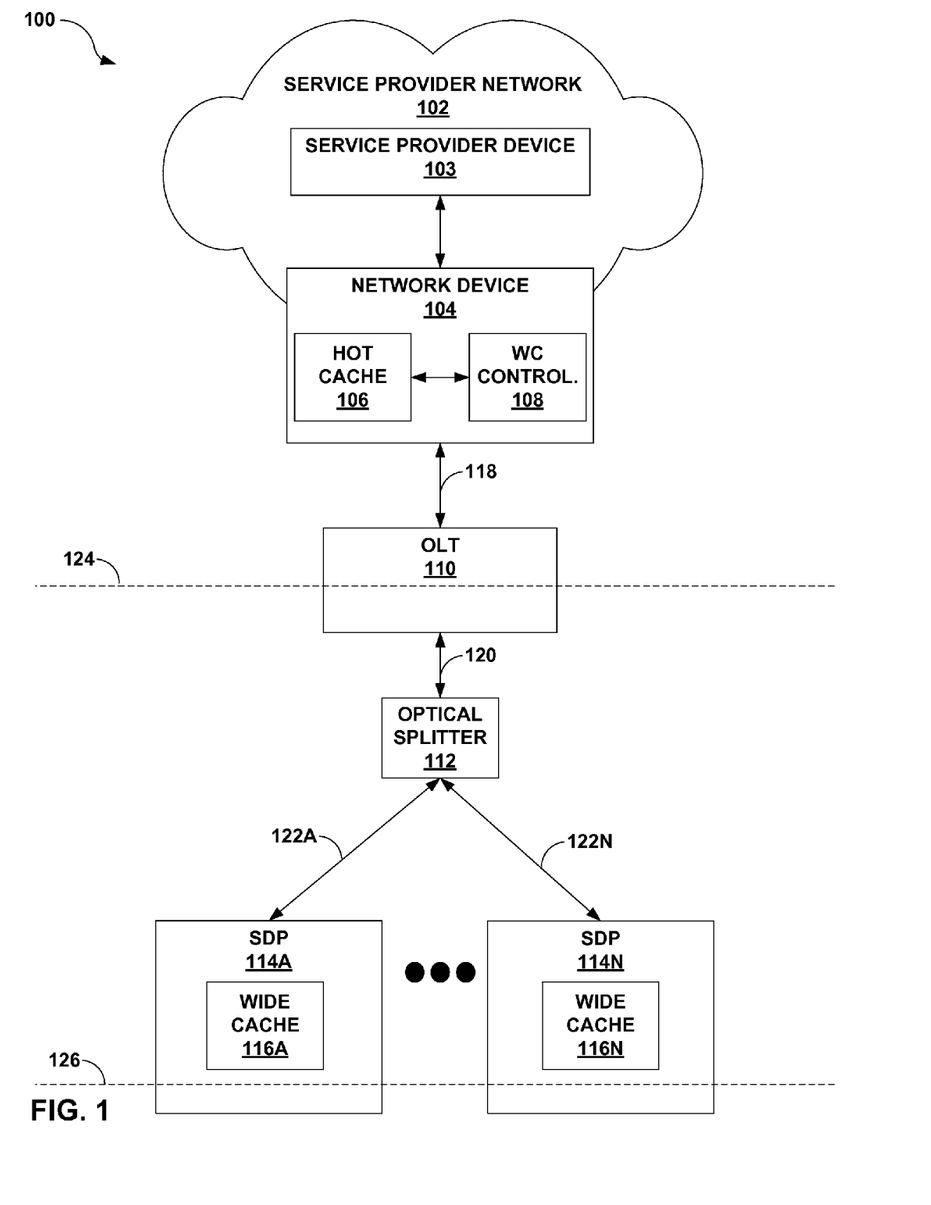
FIG. 1 is a block diagram illustrating an example network system that includes a cooperative distributed caching system in accordance with one or more techniques of this disclosure.

FIG. 1 is a block diagram illustrating an example network system 100 that includes a cooperative distributed caching system that is implemented using a hot cache 106, a wide cache controller 108, and one or more wide caches 116A-116N positioned in various devices of the network system, in accordance with one or more techniques of this disclosure. Network system 100 includes network device 104, optical line terminal (OLT) 110, optical splitter 112, and service delivery platforms 114A-114N (hereinafter, "SDPs 114"). As shown in FIG. 1, network device 104 may be equipped with hot cache 106 and wide cache controller 108. Additionally, SDPs 114 may include corresponding wide caches 116A-116N (hereinafter, "wide caches 116"). Collectively, OLT 110, optical splitter 112, and SDPs 114 may form the optical delivery network (or ODN) of network system 100. In other examples, the ODN may form a portion of an active optical network (AON) that implements one or more techniques of this disclosure to perform the caching techniques described herein.

Network device 104 may be part of or otherwise coupled to service provider network 102. Service provider network 102 may represent a network that is commonly owned and operated by a service provider to provide one or more services to various customer premises that include or are otherwise accessible to SDPs 114. Service provider network 102 may provide a number of different services to the customer premises, including a voice service (often in the form of voice over Internet protocol or VoIP), a data service (which may be referred to as an Internet service or data plan) and a video service (which may be referred to as Internet protocol television or IPTV). Service provider network 102 is often a layer-three packet switched network that implements the third layer of the Open System Interconnection (OSI) reference model, where reference to layers in this disclosure may refer to layers of this OSI reference model.

As discussed, each of SDPs 114 may be part of or otherwise coupled to a respective customer network (not shown for ease of illustration purposes only). In various examples, SDPs 114 may also be referred to as "residential gateways," "customer premise devices," optical network units (ONUs), and optical network terminals (ONTs). Customer networks may represent any network that is owned and operated by the customer of the service provider. Additionally, the customer networks may each include customer premise equipment (CPE). CPE represent any device(s) that may consume one or more of the services to which the corresponding customer subscribes. Examples of CPE may include television set-top boxes, telephones, tablet computers, laptop computers, workstations, desktop computers, netbooks, ultrabooks, mobile phones (including so-called "smart phones"), video gaming devices, Internet-ready televisions, Internet-ready disc players, Internet streaming devices, portable gaming devices, personal digital assistant (PDA) devices, routers, hubs, gateways, printers or any other device capable of receiving or otherwise interfacing with the services provided via service provider network 102. In some instances, various CPE may be referred to herein as customer devices and/or subscriber devices.

Customer networks are increasingly demanding more bandwidth within service provider network 102 to receive more and more services via the Internet rather than via separate communication systems (such as a cable network or a plain old telephone system). Moreover, service providers may prefer to maintain only a single data network for administrative and cost reasons, leading to a network architecture where all services are converging on the packet switched network for delivery to customer networks served by SDPs 114. While cable networks and the plain old telephone system (POTS) may support delivery of data services in conjunction with either video or voice, these networks do not commonly provide sufficient bandwidth to support all three going forward, especially as delivery of video data is increasingly requiring ever growing amounts of bandwidth (considering that higher-resolution video is currently in high demand by many customers).

To meet both current demand and expected customer demand going forward, many service providers are forgoing previous cable networks or POTS to provide optical networks as the "last mile," meaning the last mile to the customer. Optical networks provide large amounts of bandwidth to the customer at considerable speeds. Network system 100 may represent one example of an optical network that is coupled to various customer networks via optical link 120, splitter 112 and optical fiber lines 122A-122N ("fiber lines 122"). Network system 100 may comprise a passive optical network (PON) or an active optical network (such as those referred to as an active Ethernet (AE) optical network). Information concerning gigabit-capable PONs (GPONs) can be found in the GPON standard (ITU-T G984), published by the International Telecommunication Union Telecommunication Standardization Sector, which is hereby incorporated by reference in its entirety. Other PON standards include broadband PON (BPON) (ITU G.983) and gigabit Ethernet PON (GEPON) (IEEE 802.3), all of which are incorporated herein in their respective entireties. In some implementations, system 100 may include optical network elements that implement wavelength division multiplexing (WDM). In general, network system 100 may conform to one of the standards referenced above; however, aspects of this disclosure are not so limited. Network system 100 may conform to any optical standard, various proprietary standards, as well as any combination(s) thereof.

FIG. 1 also illustrates certain boundaries, including optical communication boundary 124 and trust boundary 126. Optical communication boundary 124 and trust boundary 126 are illustrated with dashed lines to indicate that they do not represent physical components of network system 100. Instead, each of optical communication boundary 124 and trust boundary 126 may represent demarcations between regions that use different communication protocols, are associated with different user privileges, etc. For example, optical communication boundary 124 may represent a demarcation between optical fiber-based communication and non-optical fiber-based communication. More specifically, the portion of network system 100 illustrated to be above optical communication boundary 124 may transmit and receive data over non-optical fiber-based media, such as coaxial cables. The portion of network system 100 illustrated to be below optical communication boundary 124 and above trust boundary 126 may transmit and receive data using optical-fiber based communication (e.g., using optical link 120 and fiber lines 122). Additionally, portions of network system 100 illustrated to be below trust boundary 126 may transmit and receive data using non-optical fiber-based media (e.g., as might be used over customer networks coupled to SDPs 114).

As shown, portions of OLT 110 are positioned on either side of optical communication boundary 124. OLT 110 may serve as an interface between the upstream non-optical fiber-based region and the ODN region of network system 100. More specifically, OLT 110 may send to and receive from service provider network 102, non-optical fiber-based communications in various formats, such as Ethernet packets. For example, OLT 110 may communicate with one or more service provider devices, such as service provider device 103, of service provider network 102 over coaxial cable 118. In the example of FIG. 1, OLT 110 is communicatively coupled directly to network device 104, via coaxial cable 118. It will be appreciated, however, that in various implementations, other network devices, such as routers, gateways, servers, etc. may be positioned between OLT 110 and network device 104. Network device 104 may interface with, and/or be part of service provider network 102.

Trust boundary 126 may represent a demarcation based on user privileges, among other factors. In the example of FIG. 1, the regions illustrated to be above trust boundary 126 may represent a "trusted" region, while the regions illustrated to be below trust boundary 126 may represent an "open" region. More specifically, the trusted region may include devices to which subscribers may not have "write privileges." In other words, a subscriber, who is using a CPE downstream of SDPs 114, may not be granted permission to proactively store data to devices that are illustrated as being above trust boundary 126 (e.g., OLT 110 and network device 104). More specifically, the subscriber may not have permission to choose particular items of digital content, and instruct devices illustrated as being above trust boundary 126 to store the chosen items. Instead, in various instances, one or more devices illustrated as being above trust boundary 126 may reactively store digital content based on the subscriber's content requests. For example, one or more of SDPs 114 may implement transparent caching techniques to store digital content reactively to requests received from the subscriber. Additionally, in various instances, SDPs 114 may deny so-called "read privileges" to subscribers. More specifically, SDPs 114 may deny subscriber devices the permission to discern the identities, descriptions, etc. of digital content stored on respective wide caches 116. In turn, subscribers may submit traditional content requests to SDPs 114, and receive certain digital content stored on wide caches 116. However, such subscribers may not have permission to discern the origination point of the received content (e.g., one or more of wide caches 116 or hot cache 106). In this manner, techniques of this disclosure may implement caching of digital content while preserving privacy information among different subscribers who use network 100 to obtain digital content.

As shown, wide caches 116 are positioned in the trusted region of network system 100. As a result, a subscriber may be able to download digital content that is stored (or "cached") in a corresponding one of wide caches 116. However, the subscriber may not be able to actively store data to wide caches 116. By positioning wide caches 116 in the trusted region of network system 100, techniques of this disclosure may be implemented to preserve certain key features of transparent caching with respect to wide caches 116. For example, wide caches 116 may implement transparent caching by monitoring data requests and/or by monitoring the specific data that is passed downstream through wide caches 116. By denying downstream subscribers write permissions with respect to wide caches 116, techniques described herein may reduce the occurrence of data being stored to wide caches 116 by mechanisms other than transparent caching. In this manner, techniques of this disclosure may preserve the integrity of transparent caching schemes implemented with respect to wide caches 116.

In the example of FIG. 1, OLT 110 and each of SDPs 114 are communicatively coupled to optical splitter 112 using optical fiber line 120. As shown in FIG. 1, optical splitter 112 may be further coupled to one or more SDPs 114 using optical fiber lines 122. In some examples, optical splitter 112 receives data from OLT 110 in the form of an "optical signal" and distributes the optical signal to each of SDPs 114. More specifically, optical splitter 112 "splits" this optical signal to generate multiple copies of the received optical signal, transmitting a copy to each of SDPs 114. For purposes of illustration only, and in accordance with the GPON standard, optical splitter 112 is a so-called "passive optical splitter," i.e. optical splitter 112 splits an optical signal received from OLT 110 by generating multiple copies (or "optical sub-signals") of the signal and distributes the optical sub-signals to SDPs 114 using optical fiber lines 122 in the example of GPON without actively switching the sub-signals to the appropriate ones of SDPs 114 or requiring powered components. In some examples, optical splitter 112 may include, be part of, or be coupled to an optical combiner. In these examples, optical splitter 112 may receive optical sub-signals from SDPs 114, multiplex the received optical sub-signals into a combined optical signal, and then transmit the combined optical signal to OLT 110.

As shown in FIG. 1, OLT 110 terminates the line coupling the customer networks associated with SDPs 114 to service provider network 102. OLT 110 generally represents any optical device that aggregates traffic from SDPs 114 for delivery upstream via service provider network 102 to the Internet or other destination, and separates traffic from the Internet or other source for delivery downstream to separate customer networks coupled to SDPs 114. As described above, OLT 110 may be capable of optical fiber-based communication (e.g., using optical link 120), as well as non-optical fiber-based communication (e.g., using coaxial cable 118). As such, OLT 110 may serve as an interface between non-optical fiber-based service provider network 102 and the optical fiber-based ODN of network system 100. While discussed with respect to coaxial cable 118 for purposes of clarity, it will be appreciated that OLT 110 may communicate over service provider network 102 using various electrical signal-based formats, such as through the use of twisted metal (e.g., twisted pair copper wires), optical fiber-based channels, or various wireless infrastructures.

Network device 104 may be positioned upstream of OLT 110, such as within service provider network 102. Network device 104 may include, be, or be part of various types of devices, such as a router, a server, and others. Additionally, network device 104 may, in various implementations, be coupled directly to OLT 110 (e.g., via coaxial cable 118, as in the example of FIG. 1), or be coupled indirectly to OLT 110

(e.g., with other network devices positioned between network device 104 and OLT 110). In any event, network device 104 may send data to and receive data from OLT 110 in various non-optical formats, such as Ethernet packets. Network device 104 may be positioned downstream of other devices of service provider network 102, such as service provider device 103, which may, in various instances, be operated by an Internet service provider.

As illustrated in FIG. 1, network device 104 may include a cache, referred to as hot cache 106, and wide cache controller 108. Hot cache 106 may implement one or more of the transparent caching mechanisms described above. As one example, one or more components network device 104 may monitor digital content requests received from OLT 110. As another example, these components of network device 104 may survey data that passes downstream through network device 104, such as data that network device 104 retrieves from service provider network 102 in response to content requests from OLT 110, and transmits downstream to OLT 110. Using frequency-based metrics associated with the content requests and/or the data surveyed, such components of network device 104 may store, to hot cache 106, copies of certain data that network device 104 transmits to OLT 110. One example use of a frequency-based metric is an impact rating (IR) system that is described in further detail below.

Wide cache controller 108 may be configured or otherwise operable to store references to one or more of wide caches 116. One widely-used example of a reference is commonly known as a "pointer." A pointer may be described as a first data value that specifies a storage location (or "address") of a second data value. Wide cache controller 108 may store pointers that identify which of wide caches 116 include specific data, and the storage addresses of the data within the relevant ones of wide caches 116. In various implementations, wide cache controller 108 may store pointers to all data stored to each of wide caches 116, only data stored in wide caches 116 that is not currently stored to hot cache 106, only one pointer corresponding to a specific item of digital content (thereby avoiding duplication across two or more of wide caches 116), and others.

Techniques of this disclosure may enable a distributed, cooperative caching scheme through the use of wide caches 116, hot cache 106, and wide cache controller 108. As described, each of wide caches 116 may store various data through implementation of the transparent caching scheme. Each of wide caches 116 may store different data, based on specific content requests received from the respective customer networks. As one example, the data stored to wide cache 116A may not include any data that is stored to wide cache 116N. In another example, wide caches 116A & 116N may store some amount of common data, while also storing data that is not common to both. In this manner, each of wide caches 116 may store data that caters to content requests received from its respective customer network.

In some implementations, a service delivery platform, such as SDP 114A, may receive a request from a subscriber device (e.g., one or more CPE coupled to SDP 114A). The request may identify digital content, such as digital video data available through service provider network 102. SDP 114A may check whether the requested digital content is stored on wide cache 116A. As described in more detail below, SDP 114A may store digital content to wide cache 116A based on the frequency with which SDP 114A receives requests for the digital content. If SDP 114A determines that the requested digital content is stored on wide cache 116A, SDP 114A may send data associated with the requested digital content to the subscriber device that sent the request.

If SDP 114A determines that the requested digital content is not stored on wide cache 116A, SDP 114A may perform one or more operations. For example, SDP 114A may forward the received request upstream to a network device, such as OLT 100. For example, SDP 114A may forward the request to network device 104 (e.g., the upstream network device), via an upstream burst transmitted to OLT 110. In connection with forwarding the request, SDP 114A may receive, from network device 104, data associated with the requested digital content. In some examples, responsive to receiving the request, SDP 114A may increment an impact rating ("IR") of the digital content. In general, the IR of any digital content may represent a frequency with which subscribers request the digital content from a particular one of SDPs 114. By incrementing the IR of specific digital content with each received request, SDP 114A may effectively rank various digital content according to the demand for the various digital content. In some examples, SDP 114A may further qualify the IR of digital content, such as by decrementing the IR if the digital content has not been requested for a predetermined period of time, if the number of requests for the digital content declines over a predetermined period of time, etc.

In various scenarios described in more detail below, network device 104 may transmit the data from hot cache 106, retrieve the data from another one of wide caches 116, or retrieve the data from a device (e.g., service provider device 103) that is positioned upstream of network device 104 in service provider network 102. Upon receiving the data associated with the requested digital content, SDP 114A may forward the received data to the subscriber device that originally sent the request. Additionally, if the IR of the requested digital content (as incremented after receiving the request) is greater than a predetermined threshold value, SDP 114A may store, to wide cache 116A, the received data associated with the requested digital content.

As described, in certain scenarios, SDP 114A may forward a digital content request upstream, e.g., to network device 104. Upon receiving the forwarded request from SDP 114A, network device 104 may perform one or more operations. For example, network device 104 may increment an IR associated with the requested digital content. In examples, the IR value that network device 104 stores for certain digital content may vary from the IR value that one or more of SDPs 114 stores for the same digital content. More specifically, network device 104 may receive requests from more than one of SDPs 114 for the same digital content, resulting in network device 104 maintaining a higher IR for the digital content than any given one of the requesting SDPs 114.

Additionally, network device 104 may check whether the requested digital content is stored on hot cache 106. If network device 104 determines that the requested digital content is stored on hot cache 106, network device 104 may transmit data associated with the requested digital content to SDP 114A. If, however, network device 104 determines that the requested digital content is not stored on hot cache 106, network device 104 may attempt to retrieve the requested digital content from various sources, in accordance with one or more distributed cooperative caching techniques of this disclosure.

For example, network device 104 may check, using wide cache controller 108, whether the requested digital content is stored on any of wide caches 116 apart from wide cache 116A of requesting SDP 114A. More specifically, network device 104 may determine whether wide cache controller 108 includes a pointer that identifies the requested digital content. If wide cache controller 108 includes a pointer that identifies the requested digital content, network device 104 may use the pointer to determine which of wide caches 116 includes the requested digital content, and the storage address of the digital content within one or more of wide caches 116. Network device 104 may then send a backup request to the identified one of SDPs 114 (e.g., SDP 114N) that has access to the digital content stored on its respective one of wide caches 116 (in this example, wide cache 116N).

In turn, SDP 114N may receive the backup request, and respond by transmitting data associated with the requested digital content to network device 104 (e.g., via an upstream burst to OLT 110). Upon receiving the data from SDP 114N in response to the backup request, network device 104 may send the received data to SDP 114A (which forwarded the original request for the digital content to network device 104). In the event that network device 104 determines that wide cache controller 108 does not include a pointer to the requested digital content, network device 104 may instead send the backup request upstream over service provider network 102 (e.g., to service provider device 103, which is positioned upstream of network device 104 in service provider network 102).

In instances where network device 104 receives the data in response to a backup request (whether from SDPs 114 or from upstream service provider device 103), network device 104 may compare its stored IR (as incremented) of the digital content to a threshold value. Similarly to the IR-based techniques described with respect to SDP 114A, network device 104 may store the received data to hot cache 106 if the incremented IR exceeds the threshold. In various implementations, network device 104 may use a higher threshold IR value than the threshold IR values used by one or more of SDPs 114. As described, network device 104 may receive a greater number of requests for particular digital content than any one of SDPs 114 receives. As a result, network device 104 may use a higher threshold value in determining that digital content should be stored to hot cache 106.

Figure 2:
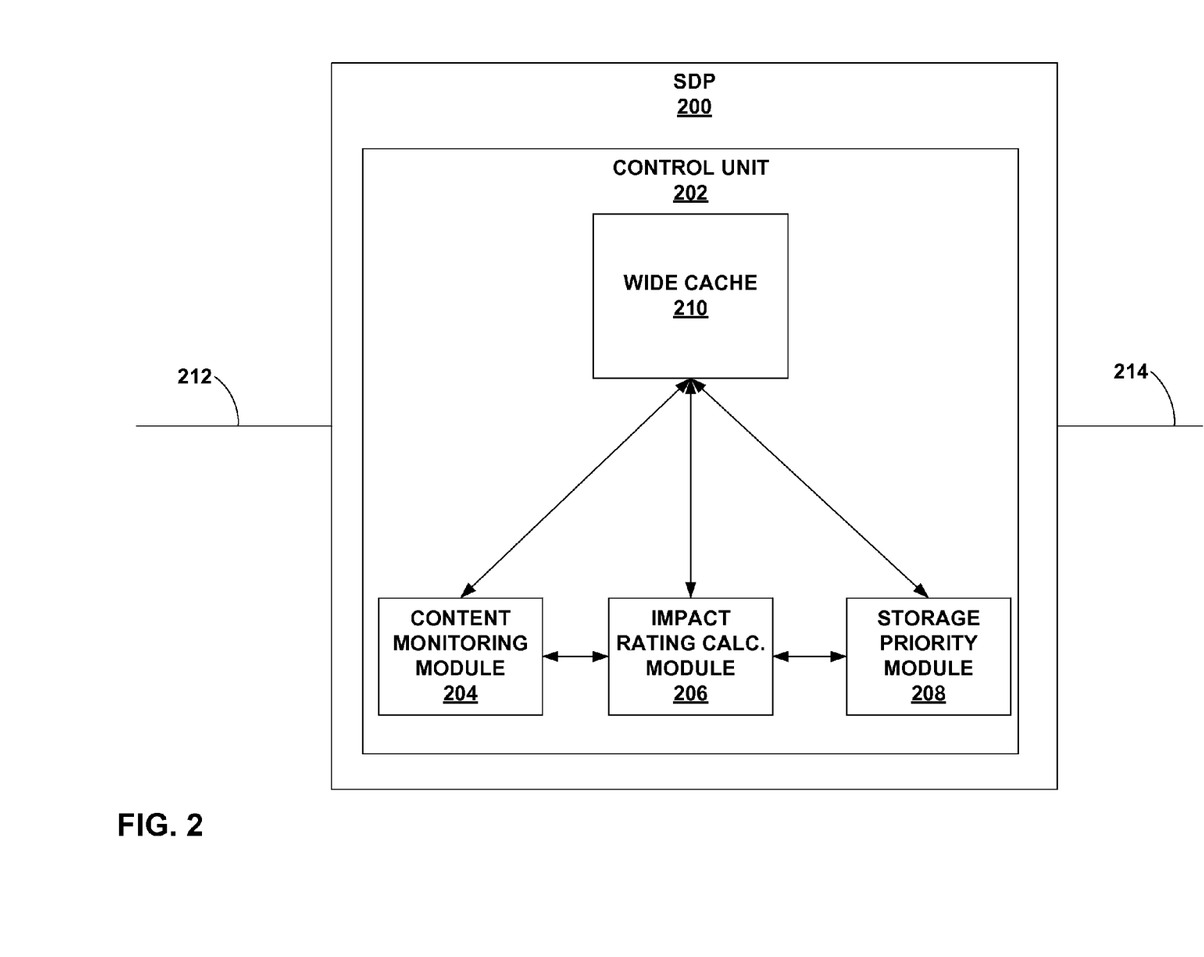
FIG. 2 is a block diagram illustrating details of an example service delivery platform, in accordance with one or more aspects of this disclosure.

FIG. 2 is a block diagram illustrating details of an example service delivery platform (SDP) 200, in accordance with one or more aspects of this disclosure. SDP 200 may be one example implementation of one or more of SDPs 114 illustrated in FIG. 1. In the context of network system 100 of FIG. 1, SDP 200 may serve as an interface between the ODN region, which relies on optical fiber-based communication, and a downstream customer network which often relies on non-optical fiber-based communication. For example, SDP 200 may communicate over the ODN region via optical fiber link 212, and communicate over the customer network using coaxial link 214. While discussed with respect to coaxial link 214, SDP 200 may, in various implementations, communicate over the customer network using metal wires other than coaxial link 214 (such as twisted metal infrastructures, including twisted pair copper), various wireless communication protocols, and so-called "fiber cables" (which may include one or more optical fibers).

Additionally, SDP 200 may include control unit 202. Control unit 202 may, in various implementations, include any combination of one or more processors, one or more field programmable gate arrays (FPGAs), one or more application specific integrated circuits (ASICs), and one or more application specific standard products (ASSPs). Control unit 202 may also include memory, both static (e.g., hard drives or magnetic drives, optical drives, FLASH memory, EPROM, EEPROM, etc.) and dynamic (e.g., RAM, DRAM, SRAM, etc.), or any other computer-readable storage device or non-transitory computer readable storage medium capable of storing instructions that cause the one or more processors (e.g., control unit 202) to perform the efficient network management techniques described in this disclosure. Thus, control unit 202 may represent hardware or a combination of hardware and software to support the below described components, modules or elements, and the techniques should not be strictly limited to any particular embodiment described below. Although various components of SDP 200 are illustrated as being included in control unit 202 in FIG. 2, it will be appreciated that one or more of these components, such as wide cache 210, content monitoring module 204, IR calculation module 206, and storage priority module 208, may be positioned externally to control unit 202 in various implementations.

In the example of FIG. 2, control unit 202 includes content monitoring module 204, impact rating (IR) calculation module 206, storage priority module 208, and wide cache 210. In various implementations, functionalities described with respect to two or more of IR calculation module 206, storage priority module 208, and wide cache 210 may be performed by a single module. Conversely, in other implementations, functionalities described with respect to any one of IR calculation module 206, storage priority module 208, and wide cache 210 may be performed by multiple modules. Additionally, in certain implementations, functionalities described with respect to one or more of IR calculation module 206, storage priority module 208, and wide cache 210 may be implemented externally to SDP 200, and SDP 200 may access the functionalities through method commonly known as "cloud computing." In some examples, SDP 200 may communicate via one or both of optical fiber link 212 and coaxial link 214 using one or more network interfaces (not shown in FIG. 2 for ease of illustration purposes only). For example, an optical network interface may enable SDP 200 to send and receive data via optical fiber link 212 while communicating with an upstream device, such as an OLT.

As described with respect to SDPs 114 of FIG. 1, SDP 200 (and/or various components thereof) may implement a caching scheme known as "transparent caching." More specifically, SDP 200 may store specific digital content to wide cache 210 based on frequency-based data associated with the digital content. As one example, content monitoring module 204 may monitor the number of requests received from the CPE of the subscriber via coaxial link 214 identifying each piece of digital content. As another example, content monitoring module 204 may monitor the number of times that the digital content is received (e.g., in response SDP 200 forwarding a request upstream over optical fiber line 212). Additionally, content monitoring module 204 may monitor content requests received via coaxial link 214 and/or digital content received via optical link 212, and communicate the monitored data to IR calculation module 206.

In turn, IR calculation module 206 may increment the impact rating (IR) of digital content based on data received from content monitoring module 204. IR calculation module 206 may increment the IR by various measures, based on the application and weighting of different parameters. An example equation that IR calculation module 206 may apply to calculate the IR value for a particular item of digital content is presented below:

$$\text{Impact Rating}=[\text{TotalHits}(N)+(2*\text{HitsToday})]*[\text{ContentMBytes}/\text{NormalMB}]$$

In the example equation presented above, "TotalHits(N)" may represent the output of a function that sums the total hits (e.g., hits may represent requests for digital content or instances of the digital content passing through SDP 200) within a predetermined time window (e.g., that corresponds to 'N' number of days). "HitsToday" may correspond to a count of all requests for the digital content on a current day, e.g., going back to a time of 0:00 (midnight) during the current day. In some implementations, HitsToday may correspond to a count of all requests for the digital content over a 24-hour window (such as from noon of a previous day to noon of a current day, a time spanning from a current time through 24 hours prior to the current time, etc.). "ContentMBytes" may correspond to a size of all content currently stored on wide cache 210. In instances where the value of ContentMBytes is not available or discernible to IR calculation module 206, IR calculation module 206 may assign ContentMBytes the same value that is currently assigned to "NormalMB" (described below).

In various examples, NormalMB may be a factor used by IR calculation module 206 to differentiate between different types of digital content. In some scenarios, IR calculation module 206 may use NormalMB to differentiate between video data streamed to CPE such as a television or a set-top box (e.g., a television show, movie, sporting event, etc.) from video data streamed to a subscriber device such as a desktop or laptop computer (e.g., clips provided by video sharing services, lower resolution video content provided on an on-demand basis, and others). For instance, NormalMB may have a value of 1050 MB for high-definition television (HDTV) content (such as 7 megabits per second, or 7 Mbps HDTV content), but may have a value of 375 MB for standard-definition television (SDTV) content (such as 2.5 Mbps SDTV content). In some implementations, content monitoring module 204 may determine whether a received item of digital content includes HDTV content or SDTV content. In various such implementations, content monitoring module 204 may send the corresponding value of NormalMB to IR calculation module 206, or may send the HDTV/SDTV classification to IR calculation module 206, using which IR calculation module 206 may derive the corresponding value of NormalMB.

In various implementations, IR calculation module 206 may use different numerical values for each of the variables described with respect to the equation described above. More specifically, IR calculation module 206 may use numerical values that are suited to IR calculations with respect to a wide cache, such as wide cache 210. Additionally, IR calculation module 206 may use different values based on whether or not the requested digital content is currently stored on wide cache 210. In various implementations, IR calculation module 206 may obtain the numerical values from one or more volatile and/or non-volatile storage devices of control unit 202, on which the current numerical values may be stored. Control unit 202 may obtain the current numerical values for the variables from various sources, such as from an upstream network device via optical link 212. In instances where control unit 202 has not received a current numerical value for a variable, control unit 202 may store a default value for the variable, such as one or more of the specific numerical values listed below.

In one implementation, IR calculation module 206 may use the following numerical values with respect to content that is not currently stored on wide cache 210: N=1 day, NormalMB=375 megabytes (MB), ContentMBytes=actual size of the requested/passing-through digital content (or, alternatively, a default value of 375 MB if the actual size is unknown), TotalHits(N)=0, and HitsToday=1. As described, IR calculation module 206 may assign an IR to new content as part of determining whether or not to store the new content to wide cache 210. In various scenarios, the combination of numerical values listed above may be suited to the determination of whether to store the new content to wide cache 210 (which, in several situations, may require the deletion of certain content currently stored on wide cache 210).

Similarly, IR calculation module 206 may use a dedicated set of numerical values in the calculation with respect to calculating and updating the IR of digital content that is already stored on wide cache 210. As one example, IR calculation module 206 may use the following combination of numerical values with respect to content that is already stored on wide cache 210: N=1 day, NormalMB=375 MB, ContentMBytes=actual size of the digital content, TotalHits(N)=[current value of TotalHits(N)+1], and HitsToday=[current value of HitsToday+1]. As shown, in the case of digital content that is already stored on wide cache 210, the numerical values of certain variables may include simple increments of already-stored values. For example, in the process of updating the IR of requested digital content that is already stored to wide cache 210, IR calculation module 206 may increment a currently stored value of HitsToday by 1 (i.e., by a single count). In this manner, IR calculation module 206 may calculate and assign an IR to various digital content using criteria suited to scenarios where the digital content is currently stored on wide cache 210 and alternate scenarios where the digital content is new.

As shown, the variables used in the IR equation may enable IR calculation module 206 to periodically update the IR of digital content, thus maintaining a more relevant and up-to-date IR for various digital content. For instance, the equation includes temporal elements, such as N, denoting a recently elapsed number of days, and HitsToday, which limits a number of hits to a current day. If an item of digital content has been requested repeatedly over an extended period of time, but has been requested with less frequency over a more recent time span, these temporal elements may reduce the IR of the item. Thus, IR calculation module 206 may effectively decrement the IR of "stale" digital content, i.e., digital content that has not been requested with a requisite frequency during a more recent time frame. In this manner, IR calculation module 206 may include both quantitative and temporal factors in dynamically updating the IR of various items of digital content. As one example, "current" content (e.g., content that has been requested frequently) may be elevated in priority/preference over stale content for storage to wide cache 210.

As shown in FIG. 2, SDP 200 may also include storage priority module 208. Storage priority module 208 may be configured or otherwise operable to determine preferences in terms of storing digital content to wide cache 210. SDP 200 may utilize one or more functionalities provided by storage priority module 208 in various scenarios. As some examples, SDP 200 may utilize the functionalities of storage priority module 208 in determining whether to replace certain digital content stored to wide cache 210 with new digital content based on a comparison of IRs, deciding between competing new digital content when available storage capacity of wide cache 210 is limited, etc.

In several scenarios, storage priority module 208 may receive data from IR calculation module 206, and use the received data in determining storage preferences for various digital content with respect to wide cache 210. In some examples, storage priority module 208 may receive the respective IRs for digital content currently stored on wide cache 210. In one such example, the received IRs may correspond to a single item of new digital content, and a single item of stored digital content. In this example, storage priority module 208 may select the single item of stored digital content based on the respective IRs of all digital content currently stored on wide cache 210. For instance, the selected single item of stored digital content may be the item with the lowest IR of all currently stored digital content. By selecting the item with the lowest IR of all digital content stored on wide cache 210, storage priority module 208 may select only those items of stored digital content that warrant replacement with new digital content of a greater IR.

Additionally, storage priority module 208 may compare the IR of new digital content with the IR of the one or more selected items of stored digital content. In some implementations, storage priority module 208 may compare the IR of each item of new digital content to the selected item(s) of stored digital content. If storage priority module 208 determines that the IR of an item of new digital content is higher than the IR of one or more items of stored digital content, storage priority module 208 may select the new digital content for possible storage to wide cache 210. In one example, storage priority module 208 may delete the selected stored digital content from wide cache 210, based solely on the higher IR of the new digital content. In this example, storage priority module 208 may store the new digital content to wide cache 210, provided that wide cache 210 has sufficient available storage capacity to accommodate the new digital content.

In other examples, storage priority module 208 may determine whether wide cache 210 has sufficient available storage capacity to accommodate the new digital prior to deleting the selected item(s) of stored digital content. In other words, if storage priority module 208 determines that wide cache 210 does not have available storage capacity sufficient to accommodate the new digital content, storage priority module 208 may not delete any digital content from wide cache 210. In this implementation, storage priority module 208 may implement the techniques of this disclosure to maximize the use of the storage capacity of wide cache 210 by preserving as much existing digital content as possible when wide cache 210 cannot accommodate new digital content having at least a threshold IR.

In various other implementations, storage priority module 208 may use other criteria, in addition to IRs of digital content, in determining whether to replace digital content currently stored on wide cache 210 with new digital content. In some such implementations, storage priority module 208 may attach greater importance to how recently various digital content was requested or, in the case of new digital content, routed downstream through SDP 200.

In these implementations, storage priority module 208 may cause IR calculation module 206 to vary the numerical values of certain variables used in the IR calculation equation. For example, storage priority module 208 may cause IR calculation module 206 to reduce the numerical value used for N, thus focusing the equation on a more recent time span. In this and other examples, storage priority module 208 may attach a greater weight to HitsToday (e.g., multiplying HitsToday by a factor greater than 2, as shown in the example equation above). In this manner, storage priority module 208 may cause IR calculation module 206 to adjust the implemented IR calculation methods in order to include or attach greater weight to various factors.

In some examples, SDP 200 may utilize one or more functionalities provided by storage priority module 208 to choose among competing items of new digital content to be stored to wide cache 210. In various scenarios, two items of new digital content may be assigned an equal IR by IR calculation module 206. In some instances, the IR shared by the two items may be sufficiently high to warrant storage to wide cache 210 (e.g., by virtue of being higher than the IR of a selected item of stored digital content, etc.). However, wide cache 210 may not have available storage capacity sufficient to store both of the items of new digital content. In such a scenario, storage priority module 208 may implement one or more techniques of this disclosure to choose one item of new digital content to store to wide cache 210.

As one example, storage priority module 208 may select an item based on the available storage capacity of wide cache 210 (e.g., one item may be of sufficiently small size to be stored to wide cache 210, while the second item may be too large). As another example, if wide cache 210 has sufficient available storage capacity for either item, but not both, storage priority module 208 may store the larger of the two items to wide cache 210. In this example, storage priority module 208 may choose to move the larger item closer to the subscriber, thus reducing the amount of data that may need to be retransmitted downstream owing to repeat requests. As another example, storage priority module 208 may select one or more characteristics of the items on which to base the determination, such as which item has been requested more recently, etc. (similar to the IR adjustment methods described above).

As described with respect to SDPs 114 of FIG. 1, SDP 200 may receive one or more requests for digital content from a subscriber device (e.g., over coaxial link 214). Responsive to the request, IR calculation module 206 may increment the IR of the requested digital content, and SDP 200 may check whether the requested digital content is stored on wide cache 210. If SDP 200 determines that the requested digital content is stored on wide cache 210, SDP 200 may send data (e.g., a copy of) associated with the digital content to the subscriber device over coaxial link 214. If, however, SDP 200 determines that the requested digital content is not stored on wide cache 210, SDP 200 may forward the received request to an upstream computing device (e.g., an OLT) over optical fiber link 212.

SDP 200 may receive data associated with the requested digital content from the upstream computing device over optical fiber link 212, and forward the received data over coaxial link 214 to the subscriber device that originally requested the digital content. In this event, storage priority module 208 may determine whether the incremented IR of the digital content is greater than a threshold value, and if so, store the received data to wide cache 210. In various scenarios, the received data may originate from a hot cache implemented on an upstream computing device, a wide cache of a different SDP of a PON to which SDP 200 is coupled, or from a service provider device (e.g., making the received data traditional "over the top" content).

In sum, SDP 200 may use various functionalities provided by control unit 202 to implement one or more techniques of this disclosure. For example, network device 300 may receive, using coaxial link 214, a request that identifies digital content. Responsive to receiving the request, SDP 200 may (e.g., using content monitoring module 204) determine whether the identified digital content is stored on wide cache 210. If the identified digital content is not stored on wide cache 210, SDP 200 may forward the request over optical link 212 to a network device (e.g., via an upstream OLT), and receive the identified digital content from the network device. In examples, the received digital content may include digital content that is stored on a hot cache of the network device, and/or digital content that is stored on another wide cache (different from wide cache 210) of another SDP (different from SDP 200) that is sent from the other SDP via the network device. SDP 200 may (e.g., using control unit 202) forward the received digital content over coaxial link 214 to the requesting subscriber device, and store, the received digital content to wide cache 210 if an IR of the digital content (as incremented by IR calculation module 208) is greater than a threshold value.

The functionalities described with respect to SDP 200 and components thereof may provide several potential advantages. As described, by storing frequently requested digital content to wide cache 210, SDP 200 may effectively move the digital content closer to the requesting computing devices and/or consumers. Additionally, SDP 200 may cater to more than one downstream consumer. For example, coaxial link 214 may connect to a coaxial splitter, which in turn may distribute content forwarded by SDP 200 to multiple consumers via the consumers' respective CPE. In other implementations, such as where SDP 200 couples to the consumer networks by non-coaxial channels, the downstream link may connect to a twisted pair hub (in the case of twisted pair copper), a passive splitter (in the case of optical fiber-based links), and others. In some scenarios, if a first CPE requests a particular item of digital content with sufficient frequency for SDP 200 to store the item to wide cache 210, a second consumer served by SDP 200 who requests the same digital content may benefit from the activities of the first consumer. More specifically, the activities of the first consumer may cause SDP 200 to store the digital content proximate to the second consumer. In this manner, techniques implemented by SDP 200 with respect to wide cache 210 may offer cross-consumer sharing of cached content, thereby mitigating resource consumption and bandwidth loss over networks to which SDP 200 is coupled.

Figure 3:
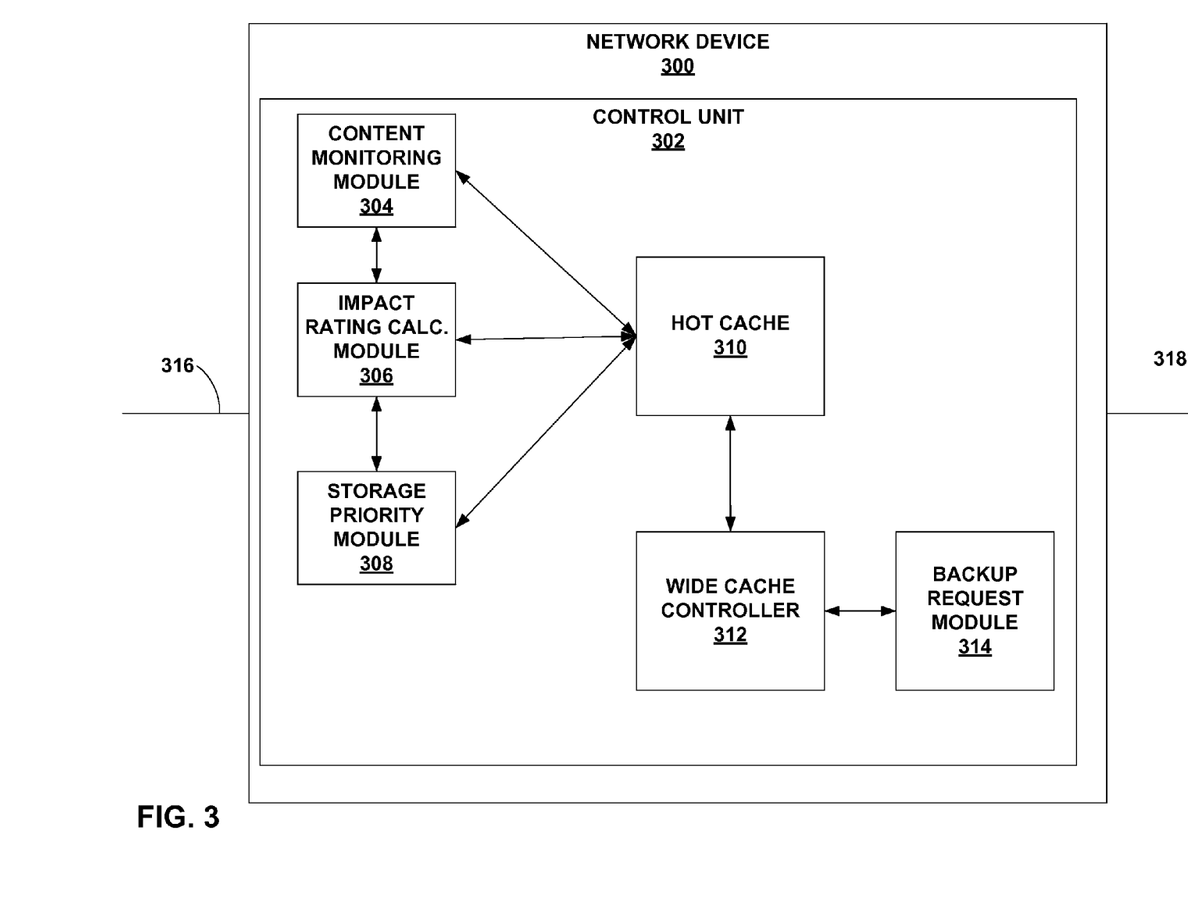
FIG. 3 is a block diagram illustrating details of an example network device, in accordance with one or more aspects of this disclosure.

FIG. 3 is a block diagram illustrating details of an example network device 300 that implements a hot cache 310 and a wide cache controller (WCC) 312, in accordance with one or more aspects of this disclosure. Network device 300 may be one non-limiting example implementation of network device 104 and/or OLT 110 illustrated in FIG. 1. Additionally, network device 300 may be coupled to a service provider network via upstream link 316 and to an optical network via downstream link 318. In examples where network device 300 is positioned upstream of an ODN, downstream link 318 may be a non-optical fiber-based medium, such as a coaxial link. On the other hand, in examples where network device 300 is coupled directly to an ODN, downstream link 318 may be an optical fiber link. In various implementations, network device 300 may use one or more network interfaces (not shown for ease of illustration purposes only) to communicate over upstream link 316 and/or downstream link 318. For example, network device 300 may receive, at a network interface, data sent from a downstream SDP via downstream link 318. Similarly, network device 300 may send data from the network interface to various downstream SDPs via downstream link 318.

Control unit 302, content monitoring module 304, impact rating (IR) calculation module 306, and storage priority module 308 may include features and perform functionalities similar to those of control unit 202, content monitoring 204, IR calculation module 206, and storage priority 208, respectively, of FIG. 2. Therefore, for ease of discussion purposes only, these components of network device 300 are not described separately herein. These components of network device 300 may perform the described functionalities with respect to storage of digital content to hot cache 310. Additionally, these components may adjust the techniques to suit the nature of hot cache 310. For example, IR calculation module 306 may use a value of three days for N (instead of one day in the case of a wide cache), and 1000 MB, or 1 Gigabyte (GB) for NormalMB (displaying a preference to conserve hot cache for larger-sized data than the 375 MB for a typical wide cache). Additionally, IR calculation module 306 may load, derive, or otherwise obtain the numerical values for variables such as ContentMBytes, TotalHits(N) and HitsToday from WCC 312, whereas a downstream SDP may not have access to the functionalities of a component similar to WCC 312 with respect to IR calculations for a wide cache.

As shown, network device 300 may include hot cache 310. Network device 300 and components thereof may store various digital content to hot cache 310, e.g., through one or more of transparent caching methods implemented by content monitoring module 304, ranking methods implemented by IR calculation module 306, and storage preference methods implemented by storage priority module 308. In some implementations, hot cache 310 may be larger (i.e., have a greater data storage capacity) than the various wide caches of the respective downstream SDPs. Such enhanced data storage capacities associated with hot cache 310 may enable network device 300 to cache digital content to cater to potentially varying requests multiple downstream SDPs.

In addition, network device 300 may be equipped with wide cache controller (WCC) 312. Through various implementations, WCC 312 may store references, such as pointers, which specify the storage locations (or "addresses") of data, such as digital content requested by downstream SDPs. More specifically, in some such implementations, WCC 312 may include pointers that specify the storage addresses of various digital content stored on the wide caches of one or more downstream SDPs. For example, a downstream wide cache, such as wide cache 210 of SDP 200 illustrated in FIG. 2, may store data associated with several items of digital content. In this instance, WCC 312 may store a separate pointer to the storage address of each item of digital content stored on wide cache 210. Similarly, WCC 312 may store multiple pointers to storage addresses of the respective wide caches of other downstream SDPs.

In some examples, WCC 312 may store pointers to only those items of digital content that are not currently stored on hot cache 310. By excluding pointers to digital content already stored to hot cache 310, WCC 312 may eliminate pointer storage for digital content that is already available from hot cache 310, and which network device 300 may not need to request from a downstream SDP or an upstream service provider device. In such implementations, WCC 312 may conserve storage space and computing resources of network device 300 by eliminating superfluous pointers. In these and other resource-conserving implementations, WCC 312 may store only a single pointer to an item of digital content, even if the same digital content is stored on multiple downstream wide caches.

In other examples, WCC 312 may store pointers to all items of digital content stored on the downstream wide caches, regardless of whether or not any such digital content is currently stored to hot cache 310. In these implementations, WCC 312 may provide network device 300 with seamless, uninterrupted access to digital content stored on the downstream wide caches, in the event that any such digital content is deleted from hot cache 310 (e.g., by storage priority module 308). Additionally, in some situations where WCC 312 includes multiple pointers to the same digital content, WCC 312 may also send an instruction and/or a pointer count to IR calculation module 306 and/or storage priority module 308 in order to store the digital content to hot cache 310. In this manner, WCC 312 may be implemented in various ways in accordance with one or more techniques of this disclosure, thus adding various advantages to the functionalities provided by network device 300.

Additionally, WCC 312 may access and supply various data to other components of network device 300, thereby enabling and/or enhancing one or more functionalities of the other components. For example, WCC 312 may supply data to IR calculation module 306, which in turn, IR calculation module 306 may use in generating IR values for various digital content that is stored on or is eligible for storage to hot cache 310. Such data may include numerical values for variables such as ContentMBytes, TotalHits(N), and HitsToday. For example, WCC 312 may store the pointers as part of a data structure (such as an array, list, tree, heap, hash, table, and other data structures known in the art). Drawing on various attributes of the data structure, WCC 312 may load numerical values, such as the size of an item of digital content (ContentMBytes), into IR calculation module 306.

In one specific example, IR calculation module 306 may require the value of ContentMBytes for an item of digital content that is eligible for storage to hot cache 310, but that is not currently stored on hot cache 310. In this situation, IR calculation module 306 may draw the necessary numerical values from WCC 312 in order to calculate the IR of an item of digital content. In one illustrative example, WCC 312 may discern the size of an item of digital content by a simple subtraction of the value of the pointer to the item from the value of a pointer to a subsequent item. In this manner, WCC 312 may supply data to other components of network device 300 that is useful or potentially vital to one or more functionalities of the other components.

As shown in FIG. 3, network device 300 may also include backup request module 314. Backup request module 314 may be configured or otherwise operable to forward requests for digital content via downstream link 318. More specifically, backup request module 314 may forward requests to various downstream SDPs, based on data drawn from WCC 312. For example, network device 300 may receive, via downstream link 318, a request for digital content from a first SDP. Responsive to network device 300 receiving the request, IR calculation module 306 may increment the IR of the requested digital content (e.g., by incrementing values such as HitsToday and TotalHits(N) of the requested digital content). Additionally, network device 300 (e.g., using functionalities provided by control unit 302) may determine whether the requested digital content is stored on hot cache 310. If the requested digital content is, in fact, stored on hot cache 310, network device 300 may transmit data associated with the digital content (e.g., a copy), to the requesting first SDP.

If, however, the requested digital content is not stored on hot cache 310, network device 300 (or components thereof, such as control unit 302) may use WCC 312 to determine whether the requested digital content is stored on a wide cache of any other SDPs to which network device 300 is coupled via downstream link 318. More specifically, network device 300 may check whether WCC 312 includes any pointers to the requested digital content. If network device 300 determines that WCC 312 includes at least one pointer to the requested digital content, network device 300 may utilize one or more functionalities provided by backup request module 314. For example, backup request module 314 may forward the received request for the digital content to a second SDP identified by a pointer of WCC 312. More specifically, the second SDP may be identified by the pointer of WCC 312 as having the requested digital content stored to its wide cache.

Additionally, the pointer may specify the storage address (e.g., a starting and/or ending addresses) of the requested digital content in the wide cache of the second SDP. In some optional implementations of the techniques of this disclosure, backup request module 314 may obtain the storage address of the requested digital content from WCC 312, and include the storage address information in the forwarded request, thereby enabling the second SDP to more easily locate and retrieve data associated with the requested digital content. In these and other optional implementations, backup request module 314 may forward the request to multiple (e.g., second and third) SDPs identified by pointers of WCC 312. In such implementations, backup request module 314 may effectively request the digital content from multiple backup sources, thereby creating more options in case of delays or failures in receiving the digital content from a particular SDP. In this manner, backup request module 314 may implement the techniques of this disclosure to provide various advantages with respect to network device 300 receiving digital content from downstream wide caches.

In scenarios where backup module 314 determines that WCC 312 does not include a pointer to the requested digital content, backup module 314 may forward the received request to an internet service provider (ISP). For example, backup module 314 may forward the request upstream to a service provider device via upstream link 316. In turn, network device 300 may receive the requested digital content from the ISP via upstream link 316. Digital content received from the ISP and forwarded downstream to the requesting SDP may form content known in the art as over-the-top ("OTT") content. Additionally, the received OTT content may provide network device 300 to store data (e.g., a copy of the OTT content) to hot cache 310, based on determinations by IR calculation module 306 and/or storage priority module 308.

Upon receiving the digital content as requested by backup request module 314, network device 300 may forward the received digital content to the requesting (first) downstream SDP via downstream link 318. Additionally, based on the incremented IR calculated by IR calculation module 306 (and/or other impact-related factors), network device 300 may store data associated with (e.g., a copy of) the received digital content to hot cache 310. In this manner, network device 300 may implement the caching techniques of this disclosure to operate hot cache 310 in either an independent fashion, or in a synergistic fashion, forming a distributed, cooperative caching system that includes hot cache 310 as well as one or more wide caches positioned downstream of network device 300.

Figure 4:
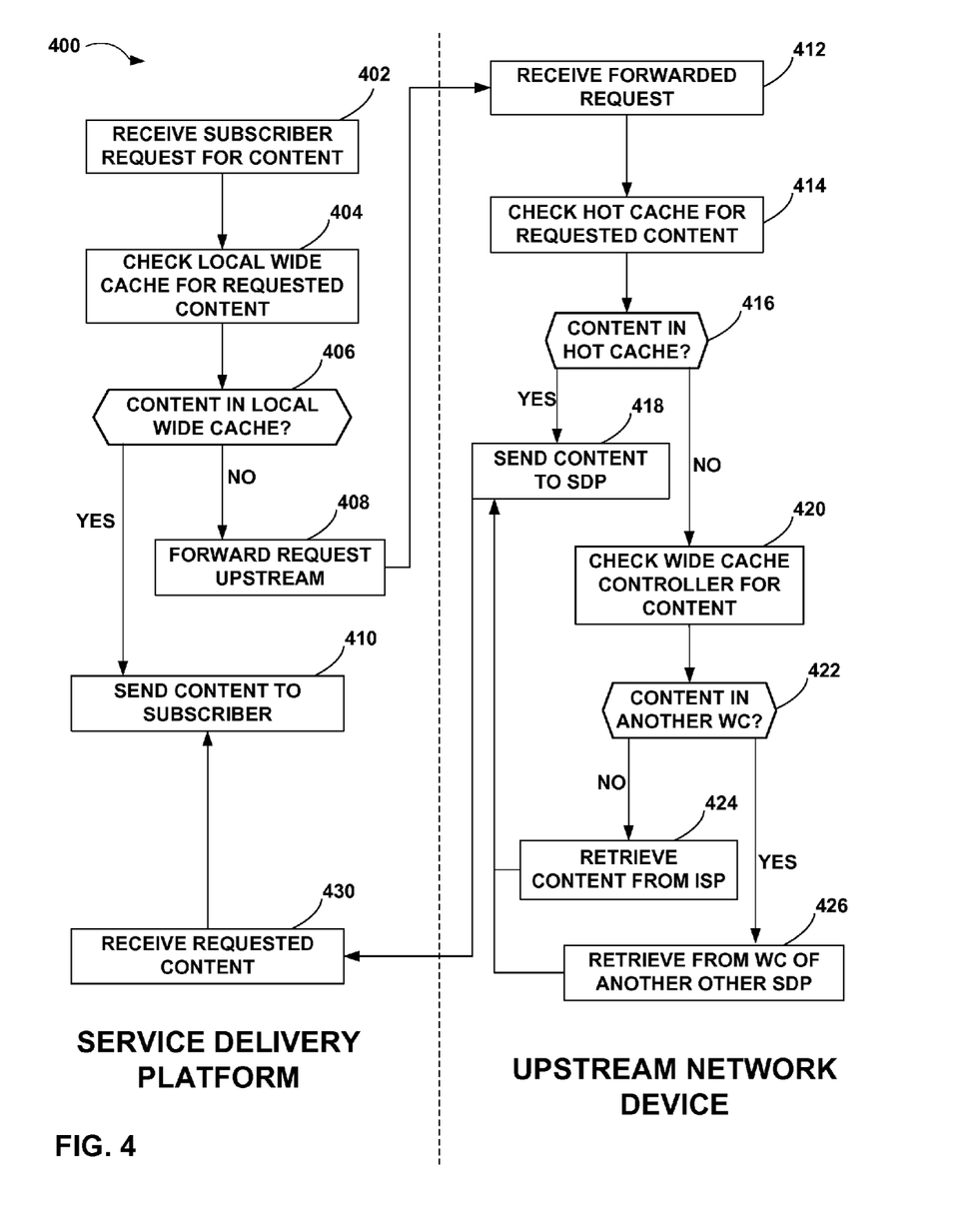
FIG. 4 is a flowchart illustrating an example process by which an upstream network device and one or more service delivery platforms may implement one or more distributed caching techniques of this disclosure.

FIG. 4 is a flowchart illustrating an example process 400 by which an upstream network device equipped with a hot cache and wide cache controller, and one or more service delivery platforms each equipped with a wide cache, may cooperatively implement one or more distributed caching techniques of this disclosure. Although process 400 may be performed by various combinations of devices, for purposes of clarity only, process 400 is described herein with reference to SDP 200 of FIG. 2 and network device 300 of FIG. 3. It will also be appreciated that, while various steps of process 400 are described herein in a particular order, other orders of these steps may be possible according to aspects of this disclosure.

Process 400 may begin when SDP 200 receives, via coaxial link 214, a subscriber request for digital content (step 402). As discussed, the subscriber request may originate from a computing device positioned in a customer network associated with SDP 200, and may include a request for one or more of audio, video, and other types of data supported by a PON to which SDP 200 is coupled via optical fiber link 212. Responsive to receiving the subscriber request, SDP 200 may check for the requested digital content on its local wide cache, namely, wide cache 210 (step 404). Based on whether or not the requested content is stored on wide cache 210, SDP 200 may perform different steps (decision block 406). For example, if SDP 200 determines that the requested content is stored on wide cache 210 (YES of 406), SDP 200 may send data associated with the content downstream, via coaxial link 214, to the subscriber (step 410).

However, if SDP 200 determines that the requested content is not stored on wide cache 210 (NO of 406), SDP 200 may forward the subscriber request upstream via optical fiber link 212 (step 408). In turn, network device 300 (which is positioned upstream of SDP 200) may receive the forwarded request via downstream link 318 (step 412). Responsive to receiving the forwarded request, network device 300 may check hot cache 210 for the requested content (step 414). Based on a determination of whether the requested content is stored on hot cache 210, network device 300 may perform varying functions (decision block 416). For example, if network device 300 determines that the requested content is stored on hot cache 210 (YES of 416), network device 300 may send data associated with the content, via downstream link 318, to SDP 200 (step 418). If, on the other hand, network device 300 determines that hot cache 210 does not include the requested content, network device 300 may check WCC 312 for pointers to the content (step 420). More specifically, network device 300 may check whether WCC 312 includes at least one pointer indicating that the requested content is stored on a wide cache of a second SDP, different from SDP 200, that is also coupled to network device 300.

Based on a determination of whether at least one pointer of WCC 312 indicates that the requested content is stored in another wide cache (e.g., of the second SDP), network device 300 may perform varying functions (decision block 422). For example, if network device 300 determines, based on checking WCC 312 for a pointer, that the requested content is not stored on the wide cache of any SDP coupled to network device 300 (NO of 422), then network device 300 may retrieve the requested content from a server provider device for an Internet service provider, e.g., by forwarding the request via upstream link 316 (step 424).

However, if network device 300 determines, based on checking WCC 312 for a pointer to the requested content, that the requested content is in the wide cache of at least a second SDP (YES of 422), network device 300 may retrieve the content from the second SDP (step 426). Upon retrieving the requested content (either from the internet service provider or from the second SDP), network device 300 may send the requested content, via downstream link 318, to SDP 200, which sent the original request (step 418). In turn, SDP 200 may receive the requested content via optical fiber link 212 (step 430), and send the received content via coaxial link 214 to a subscriber device positioned in a customer service network (step 410).

The techniques described in this disclosure may be implemented in hardware or any combination of hardware and software (including firmware). Any features described as units, modules, or components may be implemented together in an integrated logic device or separately as discrete but interoperable logic devices. If implemented in hardware, the techniques may be realized in a processor, a circuit, a collection of logic elements, or any other apparatus that performs the techniques described herein. If implemented in software, the techniques may be realized at least in part by a non-transitory computer-readable storage medium comprising instructions that, when executed in a processor, cause the processor to perform one or more of the methods described above. The non-transitory computer-readable medium may form part of a computer program product, which may include packaging materials. The non-transitory computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein, may refer to any of the foregoing structures or any other structure suitable for implementation of the techniques described herein. Likewise, the term "control unit," as used herein, may refer to any of the foregoing structures or any other structure suitable for implementation of the techniques described herein. In addition, in some aspects, the functionality described herein may be provided within dedicated software and hardware units configured to perform the techniques of this disclosure. Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various embodiments of the invention have been described. These and other embodiments are within the scope of the following claims.

What is claimed is:

1. A method comprising:
   receiving, by a network device positioned between an optical line terminal (OLT) and a service provider device, a request identifying digital content from a first service delivery platform included in a plurality of service delivery platforms, the network device being positioned downstream of the service provider device and upstream of the OLT and each of the plurality of service delivery platforms;
   determining, by the network device, whether the digital content identified by the request is stored on a hot cache of the network device, wherein the digital content identified by the request comprises requested digital content;
   when the requested digital content is not stored on the hot cache, determining, by the network device, whether the requested digital content is stored on a wide cache of a second service delivery platform of the plurality of service delivery platforms;
   when the requested digital content is stored on the wide cache of the second service delivery platform, sending, by the network device, a backup request for the requested digital content to the second service delivery platform;
   receiving, by the network device and from the second service delivery platform, the requested digital content; and
   sending, by the network device, the received digital content to the first service delivery platform.

2. The method of claim 1, further comprising:
   when the requested digital content is stored on the hot cache, transmitting the requested digital content to the first service delivery platform.

3. The method of claim 1, further comprising:
responsive to receiving the request from the first service delivery platform, incrementing an impact rating (IR) associated with the requested digital content.

4. The method of claim 3, further comprising:
comparing the incremented IR to a threshold value; and
when the incremented IR exceeds the threshold value and the requested digital content is not stored on the hot cache, storing, to the hot cache of the network device, the received digital content.

5. The method of claim 4, wherein the threshold value is equal to the lowest IR of data currently stored on the hot cache of the network device.

6. The method of claim 1, further comprising:
when the requested digital content is not stored on the wide cache of the second service delivery platform, sending the backup request to the service provider device.

7. The method of claim 1, wherein the first service delivery platform is a first optical network unit (ONU) and the second service delivery platform is a second ONU.

8. The method of claim 1, wherein determining whether the requested digital content is stored on the wide cache of the second service delivery platform comprises determining whether the requested digital content is stored on the wide cache of the second service delivery platform based on a stored reference to the wide cache of the second service delivery platform.

9. The method of claim 8, wherein the reference comprises a pointer.

10. The method of claim 1, wherein the digital content comprises at least one of video data and audio data.

11. A network device positioned between an optical line terminal (OLT) and a service provider device, the network device comprising:
a hot cache configured to store digital content;
a wide cache controller configured to store one or more references to digital content stored on a plurality of service delivery platforms (SDPs), the network device being positioned downstream of the service provider device and upstream of the OLT and each of the plurality of SDPs; and
a control unit configured to:
receive, from a first service delivery platform of the plurality of SDPs, a request identifying digital content;
determine whether the digital content identified by the request is stored on the hot cache, wherein the digital content identified by the request comprises requested digital content;
when the requested digital content is not stored on the hot cache, determine, using the wide cache controller, whether the requested digital content is stored on a wide cache of a second service delivery platform of the plurality of SDPs;
receive, from the second service delivery platform, the requested digital content; and
responsive to the request received from the first service delivery platform, send the received digital content to the first delivery platform.

12. The network device of claim 11, wherein the control unit is further configured to:
when the requested digital content is stored on the hot cache, transmit the requested digital content to the first service delivery platform.

13. The network device of claim 11, wherein the control unit is further configured to:
increment, responsive to receiving the request from the first service delivery platform, an impact rating (IR) associated with the requested digital content.

14. The network device of claim 13, wherein the control unit is further configured to:
compare the incremented IR to a threshold value; and
store to the hot cache, when the incremented IR exceeds the threshold value and the requested digital content is not stored on the hot cache, the received digital content.

15. The network device of claim 14, wherein the threshold value is equal to the lowest IR of data currently stored on the hot cache.

16. The network device of claim 11, wherein the control unit is further configured to:
send, when the requested digital content is not stored on the wide cache of the second service delivery platform, the backup request to the service provider device.

17. The network device of claim 11, wherein the wide cache controller is configured to store a pointer to a storage address of the wide cache of the second service delivery platform, and wherein the storage address is associated with the requested digital content.

18. The network device of claim 11, wherein the digital content comprises one or both of video data and audio data.

19. A computer-readable storage device comprising instructions that, when executed, cause one or more programmable processors of a network device to:
receive a request identifying digital content from a first service delivery platform included in a plurality of service delivery platforms communicatively coupled to the network device, the network device being positioned downstream of a service provider device and upstream of an optical line terminal (OLT) and each of the plurality of service delivery platforms;
determine whether the digital content identified by the request is stored on a hot cache of the network device;
when the requested digital content is not stored on the hot cache, determine, using a wide cache controller of the network device, whether the requested digital content is stored on a wide cache of a second service delivery platform of the plurality of service delivery platforms communicatively coupled to the network device;
when the requested digital content is stored on the wide cache of the second service delivery platform, send a backup request for the requested digital content to the second service delivery platform;
receive, from the second service delivery platform, the requested digital content; and
send the received digital content to the first service delivery platform.

20. A network device positioned between an optical line terminal (OLT) and a service provider device, the network device comprising:
means for receiving a request for digital content from a first service delivery platform included in a plurality of service delivery platforms (SDPs), the network device being positioned downstream of the service provider device and upstream of the OLT and each of the plurality of SDPs;
means for determining whether digital content identified by the request is stored on a hot cache of the network device, wherein the digital content identified by the request comprises requested digital content;
means for determining, when the requested digital content is not stored on the hot cache, whether the requested digital content is stored on a wide cache of a second service delivery platform of the plurality of service delivery platforms;
means for sending, when the requested digital content is stored on the wide cache of the second service delivery platform, a backup request for the requested digital content to the second service delivery platform;
means for receiving, from the second service delivery platform, the requested digital content; and
means for sending the received digital content to the first service delivery platform.

\* \* \* \* \*